April 29, 1930.  C. A. JOHNSON  1,756,360

CABLE CLAMP

Filed Feb. 23, 1926

Inventor
Chester A. Johnson,
By Chindahl Parker & Carlson
Attys.

Patented Apr. 29, 1930

1,756,360

UNITED STATES PATENT OFFICE

CHESTER A. JOHNSON, OF CHICAGO, ILLINOIS, ASSIGNOR TO JEFFERSON ELECTRIC COMPANY, OF CHICAGO, ILLINOIS, A CORPORATION OF ILLINOIS

CABLE CLAMP

Application filed February 23, 1926. Serial No. 89,852.

This invention relates to cable clamping means for outlet boxes, junction boxes, switch boxes and the like.

The use of armored cable for electric wiring necessitates the employment of a bushing device at the end of the cable to prevent the sharp edges of the armor from cutting the wire contained therein. Furthermore, it is usual to provide a clamp or collar about the cable to prevent its being withdrawn from a knock-out hole in the box into which it may be inserted.

The present invention aims to provide cable receiving boxes with a device capable of clamping a conduit or cable and of bushing the opening in the end of the cable; which in addition serves as an abutment for the end of the cable; which can be loosely contained in the box in assembled relation without danger of being rattled apart; which need not be wholly removed from the box in order to be disassembled; and which comprises a screw actuated clamping member and a bushing element mounted on the clamping member.

In the accompanying drawings I have illustrated an exemplary and the preferred form of the invention as applied to a switch box but it is to be understood that the device in details of construction and arrangement of parts may be varied to adapt it to other types of boxes. This will appear from the character of the invention as hereinafter described and by the scope of the appended claims.

In the drawings, Figure 1 shows a front elevation of a wall switch box receiving two armored cables on the upper face.

Figure 1:
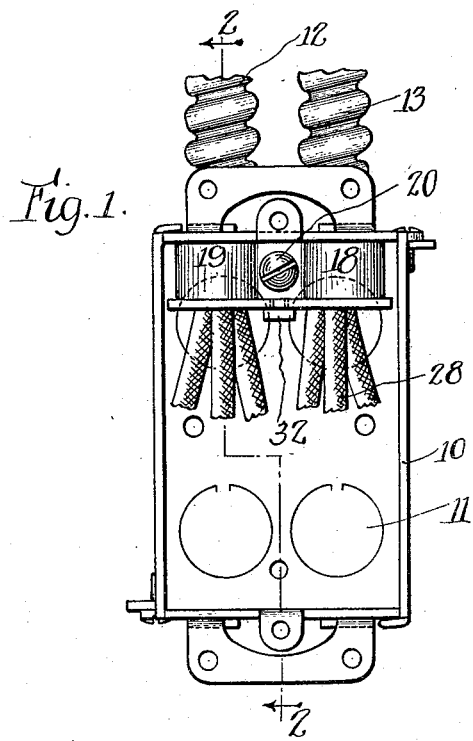
Figure 2:
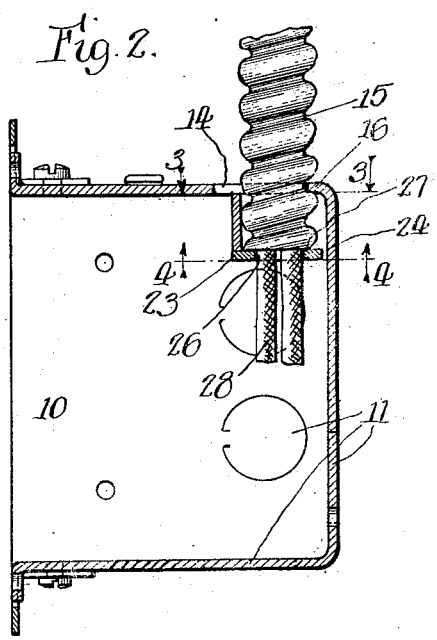
Fig. 2 is a cross section of the switch box taken on the line 2—2 of Fig. 1.
Figure 3:
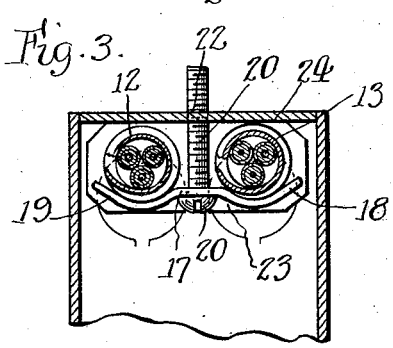
Fig. 3 is a cross section of the box taken on the line 3—3 of Fig. 2.
Figure 4:
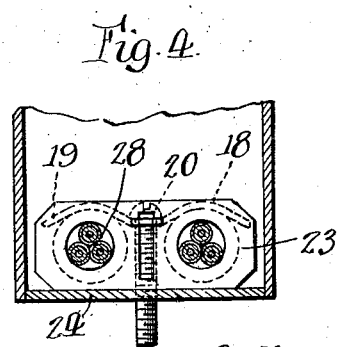
Fig. 4 is a cross section of the box taken on the line 4—4 of Fig. 2, showing the device in elevation viewed from below.

In the drawings the box employed to receive the cables is represented by a well known type of switch box 10 which is provided with knock-outs 11 variously disposed about the rear portion of the box. In the present instance the box is shown as receiving two cables 12 and 13 entering the box at the top side thereof through openings 14 produced by removing the knock-outs 11 therefrom. In the present instance the cable shown has a spiral groove 15 therein, the sides of which serve to span one edge of the hole 14, as indicated at 16 (Fig. 2) thus to aid in holding the cable longitudinally fixed. However, it is to be understood that this grooved type of cable is not necessary to the proper operation of the device, a smooth cable or conduit being equally suitable.

The clamping of the cable by the device of this invention is not necessarily effected by the engagement of the groove with the edge of the hole. The invention provides means within the box to produce pressure upon one side of the cable to pinch or bind it against a rearward portion, this being the edge of the hole in the present instance. A pressure producing means is illustrated by the yoke 17 having two wings 18 and 19, one for each of the two cables. A screw 20 passes through a hole 21 in the yoke and enters the rear face of the box at 22. The width of the yoke and its location is preferably such that it moves along the top face of the box 10 through which the cables enter.

The hole-bushing member forming part of the device of the present invention is one which is positioned in the path of the entering cable. It is arranged to serve as a stop plate or abutment to limit the insertion of the cable into the box. It is further arranged to be mounted upon the clamping yoke but is not necessarily movable therewith as the latter is drawn to the rear of the box for clamping the cables. The main object in mounting the bushing member is to permit the clamping yoke to be moved into clamping position while the bushing member remains stationary. The mounting of the bushing member on the yoke is so accomplished that it cannot fall away from the yoke when loosely positioned in the box in the absence of cable, and so that it is always in operative position in spite of any rough handling to which the box may be subjected to produce rattling of the loosely mounted parts.

In the present instance the bushing member comprises a flat plate 23 positioned below the above described yoke 17. The bushing member has an edge 24 normally lying against the rear face of the box, thus to determine its position. The bushing plate has holes 25 smaller than the end openings of the cable, the holes being spaced apart a suitable distance to accommodate the two adjacent cables 12 and 13. Furthermore, the holes are offset toward the rear of the box so that they are not concentric with the knock-out openings 14 through which the cable enters. The reason for this is because the knock-out opening is usually considerably larger than the cable employed and the plate is adapted to be positioned concentrically with the entering cable rather than a hole through which the cable enters. In order better to serve its purpose as a bushing plate, the peripheries of the holes 25 are rounded as at 26 and the material of the plate about the hole serves as a stop or abutment 27 for the end of the cable. By this construction the cable is inserted so that it abuts the plate and the portions of the wires 28 projecting from the cable thus bear against the rounded edge 26 and are prevented from being cut by the sharp edge of the cable armor.

The bushing plate 23 is provided with a construction which permits it to be held loosely and movably mounted on the yoke 17, yet capable of being stationarily positioned within the box in such a manner that the yoke is permitted to move for clamping purposes. Various constructions may be employed to secure this result but preferably the plate 23 is recessed by forming a central elongated transverse slot 29 between the two holes 25. The clamping member is provided with a part cooperating with the recessed plate for mounting the plate and for retaining it in all forward positions of the clamping member. Into the slot 29 fits a retaining lug 30 which is formed on the yoke. The lug 30 and the slot 29 are so related that the parts can be positioned for separation. The preferred arrangement is to provide a simple slot 29 and a T-shaped lug having a leg or stem portion 31 which is capable of turning within the slot 29 and having a cross member 32 of greater length than the width of the slot and parallel to the general direction of the yoke. Thus, the T-shaped lug provides retaining hooks which serve to mount the plate on the yoke, and the slot 29 and the leg 31 permit relative motion between the two parts. The above described structure necessitates that the parts be assembled at right angles to their normal functional position.

Figure 5:
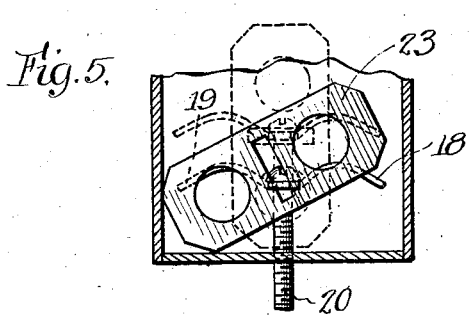
Fig. 5 is a view showing in full lines the parts in loose relation in the absence of cable, and in dotted lines in disassembling position.
Figure 6:
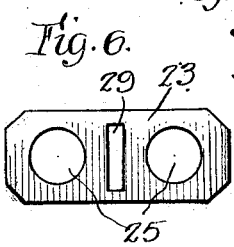
Figs. 6 and 7 are detailed illustrations of the bushing plate and clamping yoke, respectively.
Figure 7:
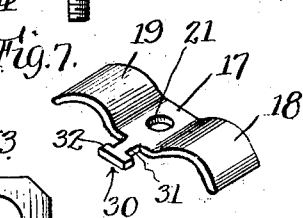

There is a preferred relation of the parts comprising the assembled device consisting of the screw 20, yoke 17, plate 23 and the box 10. The length of the plate and the length of the screw are such that the screw can be entered into the box with the yoke forwardly positioned (dotted line Fig. 5) and the plate 23 rotated about the T-leg 31 a quarter turn to allow the retaining hooked member 32 of the T to lie parallel with the slot 29. Thus the plate and yoke are positioned for separation without removing the screw from the box. The corners of the plate 23 are cut off to facilitate turning by shortening the diagonal length. However, the screw in the above position is preferably just entered into the walls of the box so that on further entering the screw to move the yoke rearwardly the plate 23 is carried sufficiently forward to prevent the above described quarter turn, thereby preventing removal of the plate from the yoke, and also removing any chance that they become rattled out of cooperating relation. By normally assembling the device with the screw sufficiently entered to prevent this turn, the parts are held always in operative relation such that they cannot be displaced without retracting the screw.

I claim as my invention:

1. A cable clamp for a box having cable receiving openings therein in one wall adjacent another wall of the box comprising, in combination, a yoke slidable along the first wall toward the second wall, a screw to draw said yoke toward the second wall to clamp cables entering said holes, a plate carried on said yoke having an edge against said second wall, said plate having a transverse slot therein, and a lug on the yoke slidable in said slot, said plate having bushing holes therein positioned to bush the ends of cables clamped by said yoke.

2. A cable clamp adapted for use in conjunction with a box having cable receiving openings therein in one wall, comprising, in combination, a yoke having two side wings for adjacent cables, a screw passing through an aperture in said yoke and into threaded engagement with the adjacent box wall for drawing said yoke to the box wall for clamping the cables, a plate carried on the yoke adapted to have an edge lie against the wall, said plate having holes therein to bush the end openings of the cable and the plate serving as an abutment for said ends, and cooperating means on the plate and yoke to retain the plate on the yoke and to permit transverse motion of the yoke with respect to the plate.

3. A cable clamp adapted for use in conjunction with a box wall, comprising, in combination, a yoke having two side wings for adjacent cables, a screw for drawing said yoke to the box wall for clamping the cables, a slotted plate having holes therein to bush the end openings of the cable and to serve as an abutment for said ends, a hooked lug projecting from the yoke into the slot in said plate, said slot extending normally parallel with the screw, said lug having its hooked portion perpendicular to the slot to retain the plate on the yoke, the plate being capable of turning on the stem of the lug for the removal of the plate from the yoke, and the screw being sufficiently long to permit turning of the plate without demounting the device from the wall of the box.

4. A cable clamping device for outlet boxes and the like comprising, in combination, a clamping member arranged to be drawn toward a wall of a box to clamp a cable entering said box, a screw passing through an aperture in said member and into screw threaded engagement with said wall, a bushing element adapted to bush such a cable, and means connecting said bushing element slidably on said member to permit said clamping member to be drawn toward the wall to clamp the cable, a portion of said element being arranged normally to abut said wall of the box.

5. In combination, a box, a plate having two bushing holes therein at the ends thereof and a central elongated slot between the holes transversely of the plate, a clamping yoke mounted for motion parallel to the plane of the plate and transversely of the plate, a lug on said plate entering said elongated slot, retaining means on said lug extending over the sides of the slot, and a screw positioned parallel to the slot for drawing the yoke toward the wall of the box, said plate having an edge arranged to abut said wall, the slot permitting movement of the yoke.

6. In combination, a box having a hole for a cable, a bushing plate positioned opposite to said hole to serve as a stop for the end of the cable, said plate being arranged to abut a wall of the box and having a slot therein perpendicular to said wall, a clamping yoke movable along one side of the plate between the plate and the box hole, a lug on said yoke projecting into said slot and hooked over the edge thereof to retain the plate and yoke together, and a screw to draw the yoke toward said wall of the box to clamp the cable entering the cable hole of the box.

7. In combination, a box having cable receiving apertures in a wall thereof, a plate positioned parallel to said wall and having two bushing holes therein substantially alined with said apertures and a transverse elongated slot therebetween, a clamping yoke mounted for movement parallel to and transversely of the plate, a lug on said plate slidable in said slot and having retaining means extending over the sides of the slot to hold the plate to the yoke when the plate is parallel to said wall and to permit the plate to be slid off the lug when the plate is tipped with respect to the wall, and a screw passing through an aperture in said yoke and into threaded engagement with the wall of the box for drawing the yoke toward the wall, said screw being sufficiently long to permit said plate to be tipped with respect to the wall and disengaged from the yoke without disengaging the screw from the box.

8. In combination, a box having cable receiving apertures in a wall thereof, a plate positioned parallel to said wall and having two bushing holes therein substantially alined with said apertures, a clamping yoke mounted for movement parallel to and transversely of the plate, interengaging means on said plate and yoke arranged to connect the plate to the yoke when the plate is parallel to said wall and to permit the plate to be disengaged from the yoke when tipped relative to said wall, and a screw passing through an aperture in said yoke and into threaded engagement with the wall of the box for drawing the yoke toward the wall, said screw being sufficiently long to permit said plate to be tipped with respect to the yoke to permit the plate to be disengaged from the yoke without disengaging the screw from the box.

In testimony whereof, I have hereunto affixed my signature.

CHESTER A. JOHNSON.